R. L. DICKERSON.
VEHICLE COUPLING.
APPLICATION FILED MAR. 20, 1918.
1,314,577.
Patented Sept. 2, 1919.
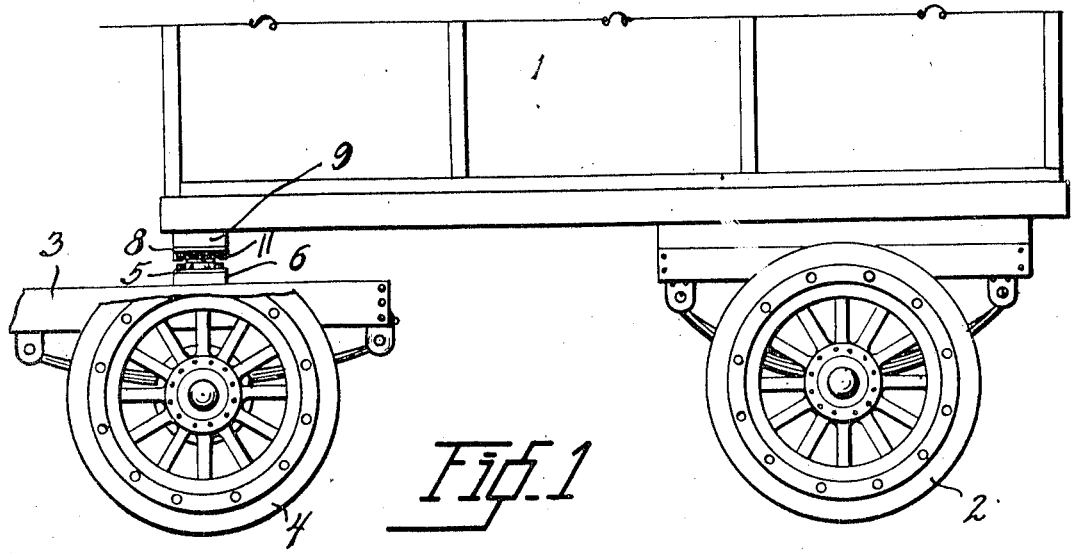
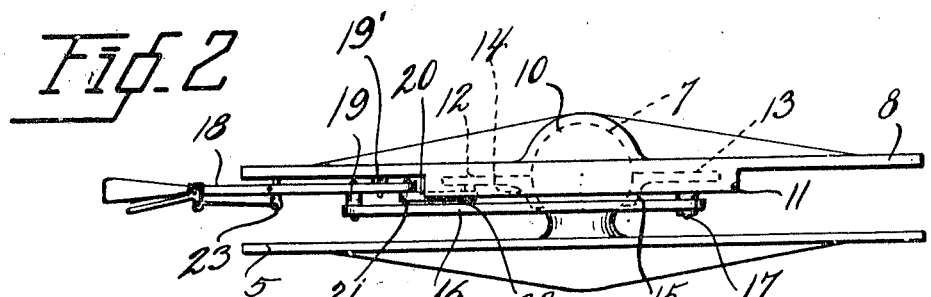
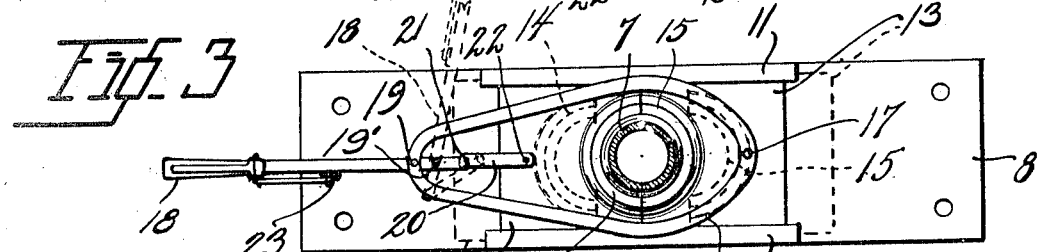
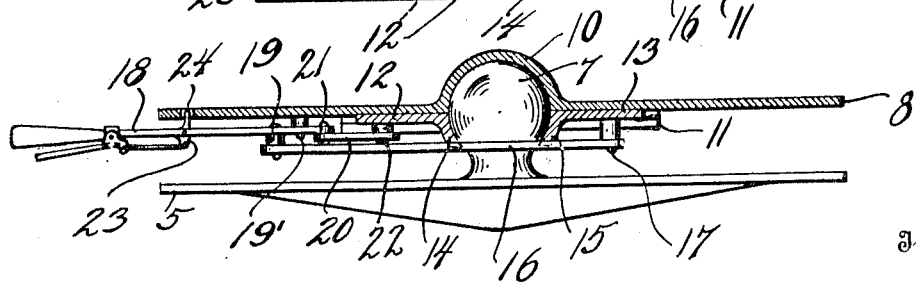
Inventor
Raymond L. Dickerson
By Herbert E. Smith
Attorney

UNITED STATES PATENT OFFICE.

RAYMOND L. DICKERSON, OF SPOKANE, WASHINGTON, ASSIGNOR OF ONE-THIRD TO ANDREW S. JONES, OF SPOKANE, WASHINGTON, AND ONE-THIRD TO W. J. MICHELET, OF PORTLAND, OREGON.

VEHICLE-COUPLING.

1,314,577.  Specification of Letters Patent.  Patented Sept. 2, 1919.

Application filed March 20, 1918. Serial No. 223,512.

*To all whom it may concern:*

Be it known that I, RAYMOND L. DICKERSON, a citizen of the United States, residing at Spokane, in the county of Spokane, State of Washington, have invented certain new and useful Improvements in Vehicle-Couplings, of which the following is a specification.

The present invention relates to improvements in vehicle couplings, and particularly designed for use in coupling a trailer of the two wheel type to a draft automobile, in order to permit the trailer to have freedom in turning, and to insure a secure coupling of the two vehicles.

The invention consists in certain novel combinations and arrangements of a ball and socket connection or coupling, and securing means therefor, as will be hereinafter more fully described and claimed.

In the accompanying drawings one complete example of the physical embodiment of the invention is shown as applied to a two wheel trailer or cart and its draft motor vehicle, the parts being combined and arranged according to the best mode so far devised for the practical application of the principles of the invention.

Figure 1 is a view showing in side elevation, a two-wheel cart or trailer and the rear end of a draft automobile or truck, with the coupling of the present invention utilized therebetween.

Fig. 2 is a front elevation of the parts, enlarged, and the device detached from the vehicles.

Fig. 3 is a bottom plan view of the socket member of the coupling, showing the ball in section, and also showing the locking devices for the coupling.

Fig. 4 is a longitudinal sectional view of the socket member of the coupling and locking plates, in their relation to the remaining parts of the device.

In the preferred embodiment of the invention a two wheel trailer is illustrated which is provided with the usual body 1 and pair of wheels 2, and the truck or tractor to which the trailer is coupled has the usual frame 3 and rear wheels 4. In converting the truck or automobile for use with the trailer, the attaching plate 5 of the ball member of the coupling is bolted or otherwise secured to the rear transverse sill or beam 6 of the truck, and this plate is provided with a central ball or head 7 forming part of the coupling.

The trailer has attached thereto a complementary plate 8 secured to the bolster 9 extending transversely of the body of the trailer at the front, and this upper plate has formed therein a hemispherical socket or inverted cup 10 to receive the head or ball which of course is spherical in form to fit within the socket.

The weight of the forward part of the trailer is thus borne by the coupling of the ball and socket and the trailer, at the front, is supported by this coupling, with the trailer free to swing or turn and follow the movements of the truck ahead of it.

To make the coupling secure and prevent accidental displacement a locking or retaining device is utilized, and for this feature the upper plate 8 which is bolted to the trailer bolster, is provided with side wings or flanges 11, 11, forming grooves or guide ways for a pair of opposed slide plates 12 and 13 that are movable under the face of the plate 8 and guided in their movement by these flanges. Each slide plate is formed with a semicircular, curved flange as 14 and 15, which are fashioned on the curve of the spherical head or ball 7, and adapted to fit up against the head and form a continuation of the hemispherical socket 10, thus confining the head or ball within its socket, but permitting freedom of movement of the ball and socket.

These locking plates are held in closed position through the instrumentality of a yoke 16 pivoted at 17 on the slide plate 13, and the yoke in turn has pivoted at its free end, a locking lever 18, the pivot being indicated at 19. An extension link 20 is pivoted at 21 to the lever and at 22 to the slide plate 12, and the usual locking pawl 23 for the lever may engage the socket 24 in plate 8 to hold the lever in locked position.

This invention is especially applicable for use where it is desired to haul a loaded trailer to its destination, uncouple the loaded trailer and leave it for future unloading, and replace the loaded trailer by an empty one. Thus, when the loaded trailer is to be uncoupled, the lever 18 is swung around on its pivot 19' to the dotted position of Fig. 3, which turns the link as indicated to draw out the plate 12, and by the same action, the "floating" yoke which is supported solely on its two pivots 17 and 19, is moved to the right to draw the slide plate 13 to the right in Fig. 3. In this manner both of the slide plates are withdrawn from the center of the coupling plates and the flanges of the slide plates are moved away from the ball or head, leaving the hemispherical socket alone in engagement with the head. The front end of the trailer may then be elevated and thus freed from the head. The trailer is properly supported, and the truck withdrawn from beneath it, and then an empty trailer may be coupled to the truck, and by manipulation of the lever 18 the locking slide plates may be returned to closed position about the head as before.

Claim:

The combination with the bolster plate and its spherical head, of a sill plate having a socket and guide flanges on the plate, opposed slide plates movable in the flanges and each having a semicircular curved flange coacting with the socket on the head, a yoke pivoted on one slide plate, a pivoted link on the other slide plate and a lever fulcrumed on the bolster plate and pivoted to said link.

In testimony whereof I affix my signature.

RAYMOND L. DICKERSON.